(12) United States Patent
Squyres (10) Patent No.: US 6,666,133 B2
(45) Date of Patent: Dec. 23, 2003

(54) STANDING TREE BALER

(76) Inventor: Lee W. Squyres, R.D. 1, Box 104, New Ringgold, PA (US) 17960

( * ) Notice: Subject to any disclaimer, the term of this patent is extended or adjusted under 35 U.S.C. 154(b) by 77 days.

(21) Appl. No.: 09/832,006

(22) Filed: Apr. 11, 2001

(65) Prior Publication Data

US 2002/0148365 A1 Oct. 17, 2002

(51) Int. Cl.$^7$ ............................................... B65B 13/10
(52) U.S. Cl. ............................ 100/13; 100/27; 53/530
(58) Field of Search ............................... 100/1, 2, 3, 8, 100/13, 26, 27; 53/530, 529, 576, 589; 47/1.01 R (56) References Cited

U.S. PATENT DOCUMENTS

| | | |
|---|---|---|
| 221,972 A | 11/1879 | Murray et al. |
| 988,347 A | 4/1911 | Johnson |
| 1,877,548 A | 6/1932 | Brimer |
| 2,482,392 A | 9/1949 | Whitaker |
| 2,581,479 A | 1/1952 | Grasham |
| 2,792,775 A | 5/1957 | Beyette |
| 2,797,634 A | 7/1957 | Rueckert |
| 2,966,111 A | 12/1960 | Yafjack |
| 2,974,457 A | 3/1961 | Saxton |
| 3,015,187 A | 1/1962 | Grether |
| 3,445,985 A | 5/1969 | Manetta |
| 3,747,293 A | 7/1973 | Van Slooten et al. |
| 4,049,032 A | * 9/1977 | Oldenburg et al. ...... 144/24.13 |
| 4,619,193 A | * 10/1986 | Crew ........................... 100/13 |
| 4,628,671 A | 12/1986 | Storm et al. |
| 4,939,989 A | 7/1990 | Zacharias |
| 5,421,140 A | 6/1995 | Theriault |
| 5,590,592 A | 1/1997 | Irvin |

OTHER PUBLICATIONS

Caretree Systems, Standing Tree Baler, 1996, 13 pages.

* cited by examiner

Primary Examiner—Allen Ostrager
Assistant Examiner—Shelby Self
(74) Attorney, Agent, or Firm—Volpe and Koenig, P.C.

(57) ABSTRACT

An apparatus for in-situ baling of trees is provided. The apparatus includes a first frame which supports a rotatable second frame. A tree trunk is inserted into the first and second frames. The second frame is rotated by a motor as the frames are elevated toward the top of a tree. During elevation, string is dispensed from a cannister on the second frame, baling the tree. The dispensed string is then secured completing the operation.

23 Claims, 5 Drawing Sheets

STANDING TREE BALER

BACKGROUND

The present invention provides an apparatus used for baling a standing tree as well as a method of baling trees. More specifically, the present invention allows a user to bale a standing tree with string such that its branches are inwardly compressed to allow for ease of moving and transport of the tree.

Tree baling is a process of bundling the branches of a tree toward the trunk into a compressed state such that the baled tree can be more easily transported after it is balled or cut, and is common in the tree nursery and Christmas tree industries. Baling is a necessary step to aid in removal and transport of the trees. Transportation of trees without baling is difficult because of tree bulkiness. As a result of baling, the trees are less likely to be damaged in transit because the fragile branches are bundled together into a cohesive unit. Trees with their branches extended, however, are easily damaged because the branches extending from the trunk can easily hit objects resulting in damage.

In the past, various balers have been used to provide for easier transport of trees. In Christmas tree harvesting, trees were first cut and then hauled to a baler. The tree was then pulled through a horizontally situated cone to compress the branches to a desired maximum circumference while string or netting is applied around the outer circumference of the tree. This methodology has an inherent drawback of requiring the severance of the tree before baling. A harvester must often locate the hard to reach trunk of the tree in order to sever it. As a result, the severing takes additional time. Additionally, this type of baler cannot be used for nursery stock intended for replanting, and the user must either manually bale these types of trees or have a separate in-situ baler.

Apparatus for baling trees in-situ have an inherent advantage for nursery stock and also allow for ease of severance and reduction of tree damage during felling and movement of Christmas trees. Current apparatus used, however, have their own inherent drawbacks. Some in-situ balers are massive in size having an overall length in excess of the height of the baled tree. Other apparatus have many mechanical joints resulting in complex machines, with high fabrication costs and low reliability.

There is a need to produce a tree baler which provides for ease of use by the operator while achieving high operability standards.

SUMMARY

The current invention provides an apparatus for baling a standing tree. The apparatus includes a first frame which defines a central area which is adapted to receive a lower trunk portion of a tree. A front portion of the first frame includes two sections mounted for movement from a first, closed position to a second, open position to permit entry of a tree trunk into the central area. Generally, once a tree trunk is inserted through the two sections and into the first frame, the sections return to the first position. A plurality of pivotable segments are connected to the first frame. These pivotable sections define an adjustable cone-shaped structure around the central area which automatically adjusts to the size of a tree as the tree is baled. A second frame having a front portion with an opening is mounted for movement around the central area below the first frame. A string dispensing canister is attached to the second frame. A first motor is connected to the first frame and drivingly connected to the second frame to rotate the second frame around the central area such that string from the string from the canister is wound around the tree. The first frame is adapted for attachment to an elevateable support capable of placing the first frame around the tree trunk and raising both the first and second frames to the top of the tree so that as the first and second frames are raised, string is dispensed from the canister and wound around the tree.

A method of baling a tree is also provided and includes placing the trunk of a tree into the central area of the first and second frames of a baling apparatus by moving with two pivotable front sections of the first frame which move from a first, closed position to a second, open position to allow entry of the trunk as the baling apparatus is moved toward the trunk, prior to returning to the first closed position. A first end of the string contained in the string dispenser is secured to the tree to be baled. The apparatus is then elevated, while rotating the second frame, toward the top of the tree. While the unit is elevated, string is dispensed to hold the uplifted branches of the tree. Once the top of the tree has passed through the central area of the apparatus or the apparatus has reached a maximum height, the apparatus is removed from the tree. The dispensed string is then cut and preferably secured to the tree providing a constriction of the branches.

DETAILED DESCRIPTION OF THE PREFERRED EMBODIMENT

Figure 1:
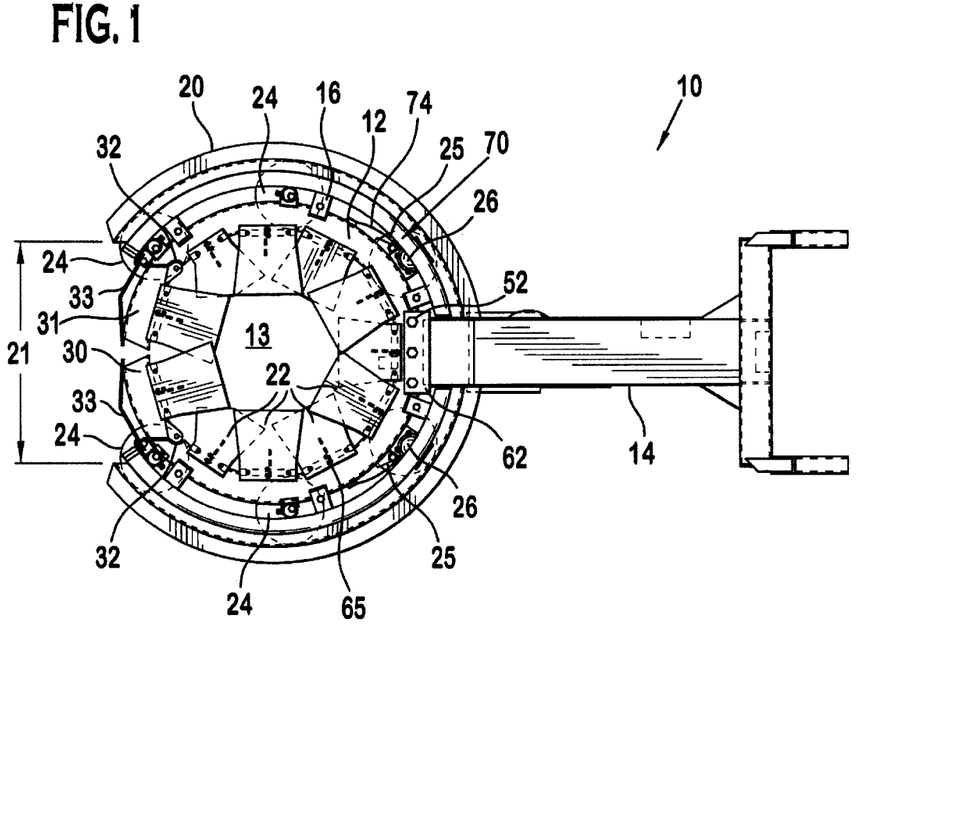
FIG. 1 is a top plan view of the tree baling apparatus in accordance with a preferred embodiment of the present invention.
Figure 2:
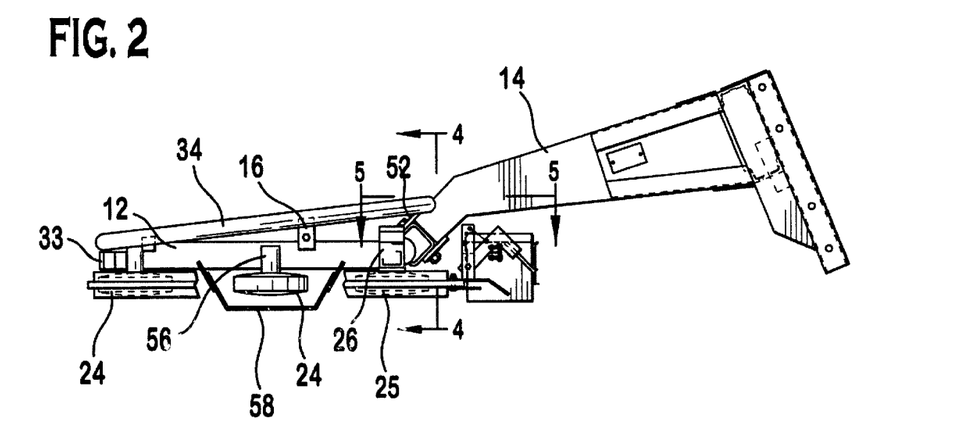
FIG. 2 is a side elevation view of the tree baling apparatus shown in FIG. 1.

Referring to FIGS. 1 and 2, a tree baling apparatus 10 in accordance with the present invention is shown. The tree baling apparatus 10 is comprised of a first frame 12 that provides structural support and rigidity during tree baling operations. The first frame 12, is preferably generally circular shaped with an open section to allow a tree trunk to enter into the central area 13. The first frame 12 is preferably constructed from steel tubing, however other structural members in the form of beams, tubes or angles may be used. Likewise, the first frame 12 can be made from suitable materials including but not limited to, stainless steel, aluminum or other metallic materials.

Figure 9:
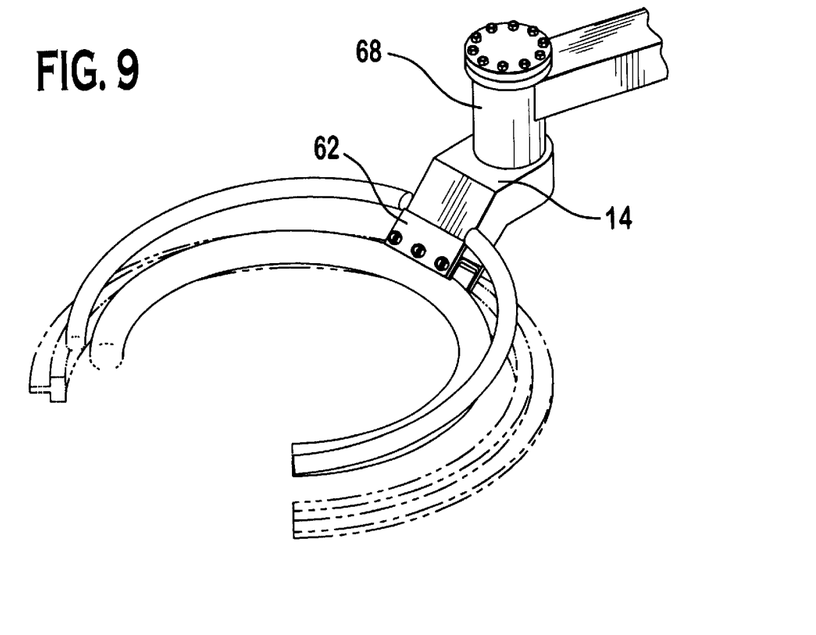
FIG. 9 is a side perspective view of the tree baling apparatus with a rotary support connection to the lift vehicle.

The first frame 12 is connected to a support arm 14. The support arm 14 is adapted for attachment to a lifting mechanism such as a fork lift or other lift-type vehicle. Preferably, bolts 52 are used to connect the first frame 12 to the support arm 14 through a support plate 62. However, as will be recognized by those skilled in the art, other types of connecting means may be used, such as rivets, screws, other fasteners or welds. Alternatively, as shown in FIG. 9, a rotary actuator 68 may be connected between the first frame 12 and the support arm 14. The actuator 68 provides a rotary connection between the first frame 12 and the lift type vehicle. The actuator may be powered by an auxiliary hydraulic power take-off type. In the preferred embodiment, a Helac Model HBI-25K-RF-LF-H is used, however, those skilled in the art will recognize that other actuators may be substituted to provide similar functionality.

The first frame 12 has support plates 16 attached to the outer surface which are preferably used to support a third frame 34, as described in detail below. The support plates 16 can be attached to the first and third frames through various different mechanical connections, such as welding or mechanical fasteners. In the preferred embodiment shown, a welded connection is used. Tube supports 56 are also preferably attached to the first frame 12 to support the wheels 24 used to provide a rotational connection to the second frame 20, as described below. The wheels 24 keep the second frame 20 in alignment during rotation.

Figure 3:
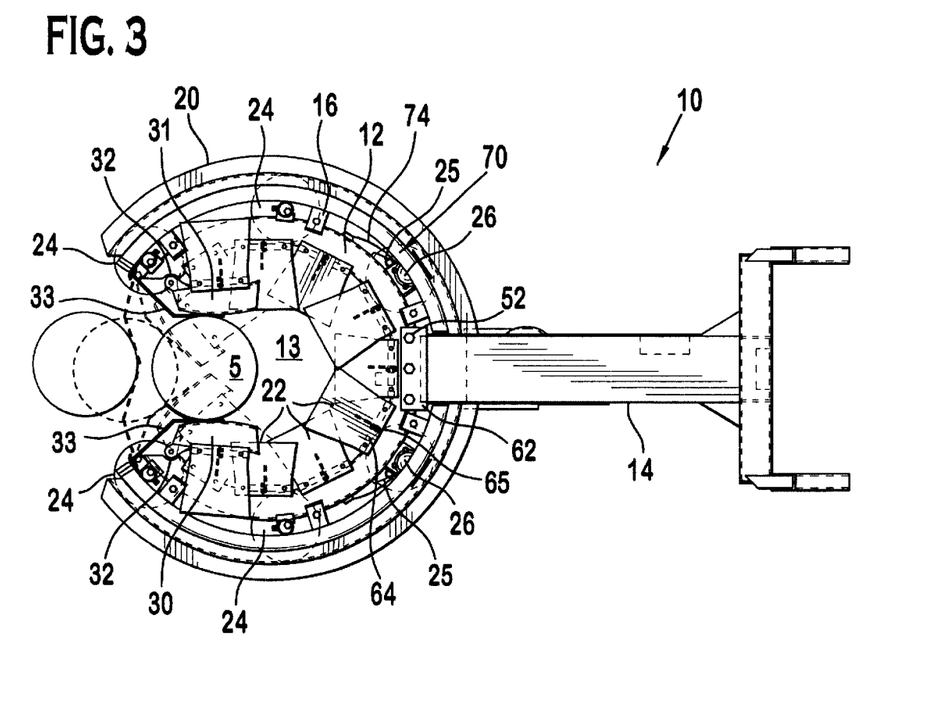
FIG. 3 is a top plan view of the tree baling apparatus shown in FIG. 1 showing the front frame sections opening to receive a tree trunk.

The open front portion of the first frame 12 includes two sections 30 (also referred to as "front sections") which are mounted for movement from a first, closed position, as shown in FIG. 1, to a second, open position as shown in FIG. 3 to permit entry of a tree trunk 5 into the central area 13. The two sections 30, 31 then return back to the first position, shown in FIG. 1, to form a circular enclosure around the lower trunk portion 5. Preferably, the two sections 30, 31 are formed from pipe sections that are pivotably connected to the ends of first frame 12. In the first preferred embodiment, springs 32 are provided at the pivotal connection to bias the two sections 30, toward the closed position, as shown in FIG. 1. Preferably, deflector plates 33 are pivotably mounted to the first frame 12 adjacent to the pipe sections to cover the springs 32 and permit smooth entry of the tree trunk 5 into the central area 13.

Figure 8:
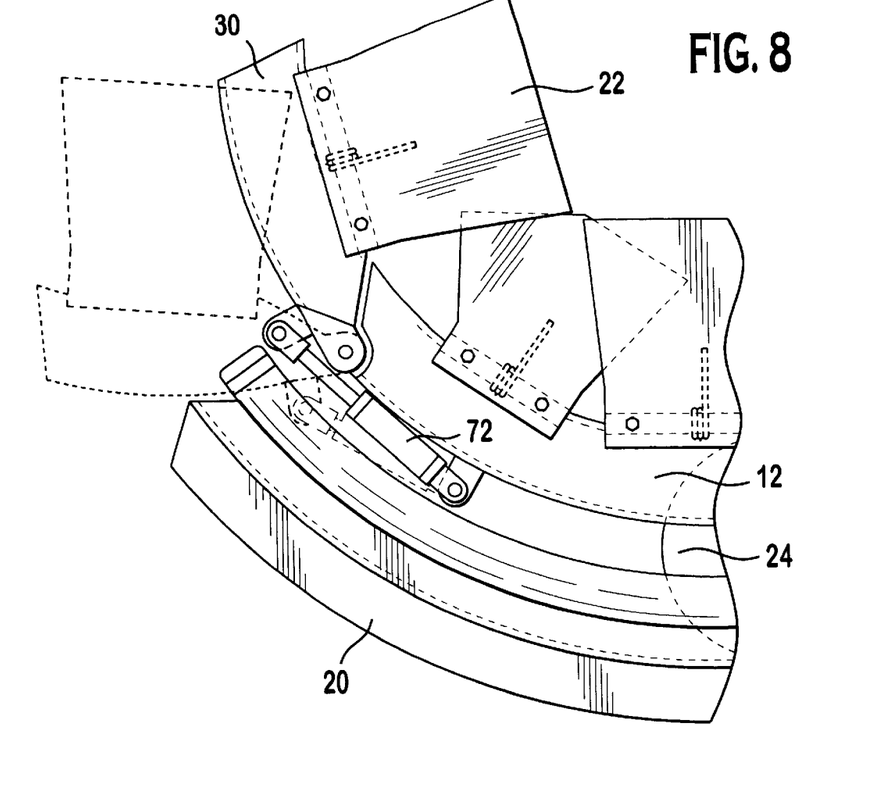
FIG. 8 is a top plan view of the tree baling apparatus with front section actuators in accordance with an alternate embodiment of the present invention.

Alternatively as shown in FIG. 8, the front sections 30, 31 of the first frame 12 may be openable away from the tree baling device central area 13 via actuators 72. As will be recognized by those skilled in the art, the section actuators 72 may be hydraulic cylinders which can be controlled from a remote location. The hydraulic cylinders may also be equipped with an interlock feature, so that the first frame front sections 30, 31 are movable only when the second frame front section is aligned with the first frame front section 30, 31 allowing access to and from the central area 13.

As shown in FIGS. 1 and 3, the tree baling apparatus 10 preferably includes a plurality of pivotable segments 22 connected to the first frame 12 and the front sections 30, 31 to define an adjustable cone-shaped structure around the central area 13. The segments 22 pivot upon contact with a tree in order to automatically adjust to a size of the tree as it is being baled in order to press the branches inwardly. In the preferred embodiment eleven segments 22 are provided. However, the number of segments 22 may be varied. The pivotable segments 22 are each connected to the first frame 12 through pivotable connections 64 in the form of a pin connection, and a pivotable segment 22 is also connected to each front section 30, 31. The pivotable segments 22 are preferably spring biased upwardly and inwardly by springs 65 and may pivot along the pivotable connection 64 to allow variation in the inner circumference of the tree which is being baled. The pivotable segments 22 overlap each other along the outer edges to provide an overlapping cone-shaped constriction for the baled tree. The pivotable segments 22 can be made from various metallic or non-metallic materials which provide the needed structural rigidity for confinement of the uplifted branches. In the preferred embodiment, the pivotable segments 22 are made from steel plate.

Still with reference to FIGS. 1 and 2, the third frame 34, which is preferably installed on the apparatus 10, is shown. The third frame 34 acts as a deflector bar to bend the tree branches upwardly during elevation of the tree baling apparatus 10. The third frame 34 is preferably circular shaped with a corresponding section of the circle to the first frame 12 being removed to allow a tree trunk to enter into the area surrounded by the third frame 34. As noted above, support plates 16 are used to attach the third frame 34 to the first frame 12. Preferably, the connection between the support plate 16 and the third frame 34 is a welded connection.

The third frame 34 may be made from any type of structural member, however, in the preferred embodiment shown, steel tubing is used. As one skilled in the art should recognize from the present disclosure, the third frame may be made from other suitable materials having sufficient strength as well as a smooth surface in order to bend branches upwardly without causing excess damage to the branches. This may include but is not limited to stainless steel, aluminum, or other similar structural materials.

Referring now to FIGS. 1, 2, 5 and 6 a second frame 20 having a front portion with an opening 21, is mounted for rotational movement around the central area 13 below the first frame 12. The second frame 20 is preferably channel shaped, as shown most clearly in FIG. 6, and is generally circular. The second frame 20 is preferably supported on idler wheels 24, connected to the supports 56 on the first frame 12. In the preferred embodiment, four idler wheels 24, are attached to the first frame.

Figure 4:
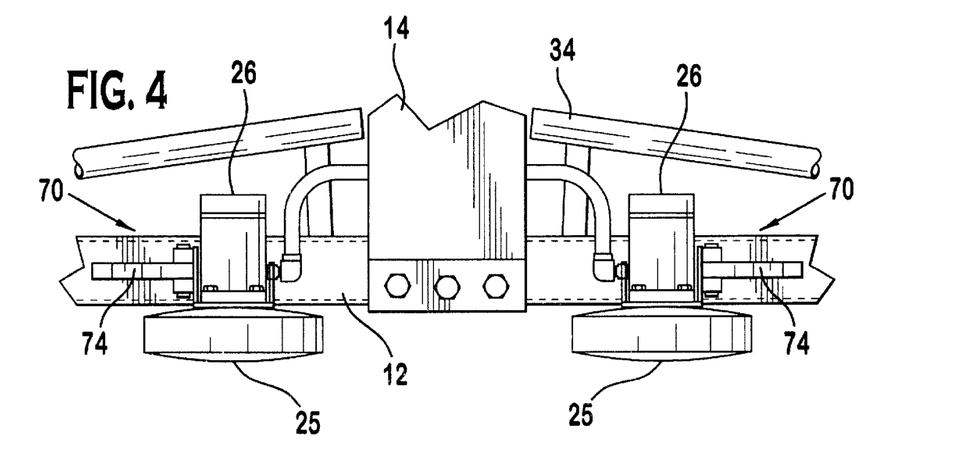
FIG. 4 is an enlarged side elevational view taken along lines 4—4 in FIG. 2.

Preferably, a motor 26 is drivingly connected to at least two drive wheels 25 which contact the second frame 20 to provide a motive force. In the preferred embodiment, as shown in FIGS. 3 and 4, two separate motors 26 are used for the drive wheels 25. The spacing of the motor driven wheels 25 is greater than the opening 21 provided in the second frame 20 to provide a constant motive force to the second frame 20 during rotation. The preferred motor 26 is a Model 101 from Eaton Inc.

In the preferred embodiment, each motor 26 is pivotably mounted to the first frame 12 by a pivotable connection 70, as shown in FIG. 4. A spring 74 biases the motor 26, and hence the attached drive wheel 25 outwardly to ensure positive drive wheel contact with the second frame during rotation despite any irregularities in the circular shape of the second frame 20. This also reduces slippage in the event that the apparatus 10 is operated in wet conditions. However, the motor 26 could be connected to the first frame 12 in a fixed manner, if desired, or other suitable means could be utilized to bias the drive wheels 25 outwardly. The spring 74 is preferably a leaf spring. However, other types of springs could be used.

To allow the tree baling apparatus to be placed on the ground without damaging it, skid plates 58 are attached to the first frame 12 to provide a ground contact surface. In the preferred embodiment two skid plates 58 are attached to the first frame 12 on opposite sides of the tree baling apparatus 10 to allow the unit to be set down. In the preferred embodiment, steel plates are used to construct the skid plates 58. As one skilled in the art should recognize, various other structural materials may be used to produce the skid plates 58, such as aluminum, stainless steel or other metallic materials.

Figure 5:
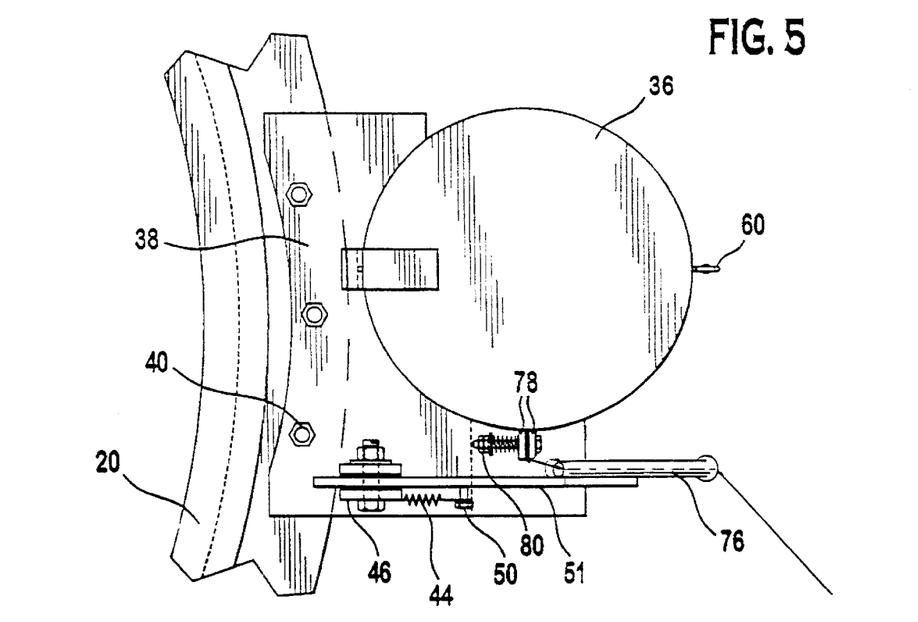
FIG. 5 is an enlarged top view of the string canister taken along lines 5—5 in FIG. 2.
Figure 6:
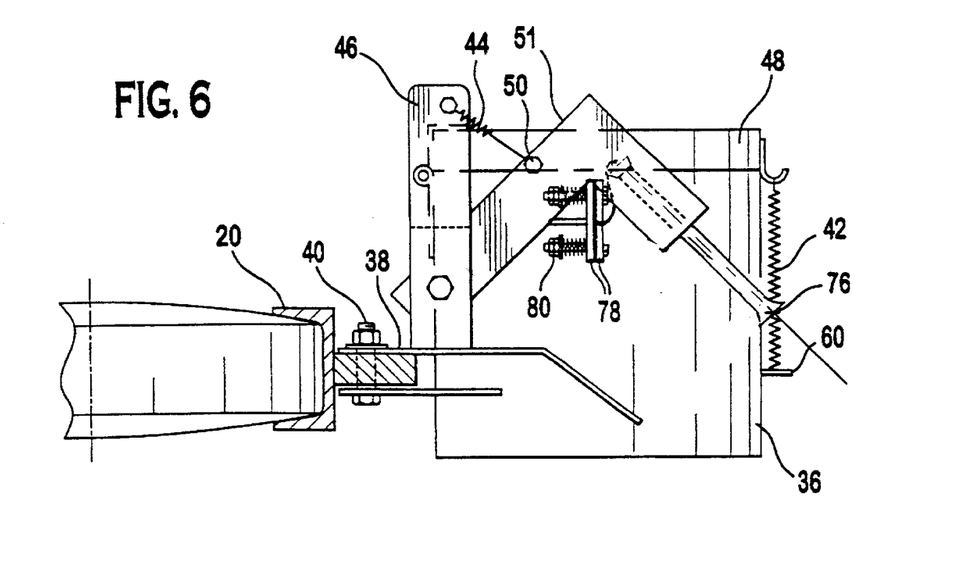
FIG. 6 is an enlarged side elevational view of the string canister.

Referring to FIGS. 2, 5 and 6, a string dispenser 36 is attached to the second frame 20. The string dispenser 36 preferably has a lid 48 with an attached J-hook connected to the side. The body of the string dispenser 36 has a string tie canister support, 60 used to aid in closing the string dispenser 36. A spring 42 is stretched from the J-hook of the lid 48 to the spring tie canister support 60 to provide constant tension on the lid to prevent the lid from opening.

The string exits from the string canister through a string tensioner 78. The string tensioner is comprised of a set of plates held to a certain compressive value by spring bolts 80 thereby tensioning the dispensed string. By adjusting the nuts on the spring bolts 80, a greater or lesser amount of compressive force may be put on the string tensioner 78 allowing greater or less tension on the dispensed string.

A string tensioning spring 44 is attached between a structural support 46 and a lift point 50 on the string positioner 51. The string positioner 51 is pivotably connected to the support 46 and keeps uniform tension on the string during baling operations. As will be understood by those skilled in the art, different string tensioning springs 44 may be used to provide differing string tensions for the positioner. Dispensed string from the string tensioner 78 feeds through the string positioner 51 which has an extension 76. The extension 76 may be lengthened or shortened to provide positioning lengths away from the unit as required by individual applications.

The string dispenser 36 is connected to the second frame 20 through a plate support 38 which is connected to both the structural support 46 and the body of the string dispenser 36. The plate support 38 is connected to the second frame 20 through bolts 40. However, other types of connection arrangements may be used including welding or riveting.

Figure 7:
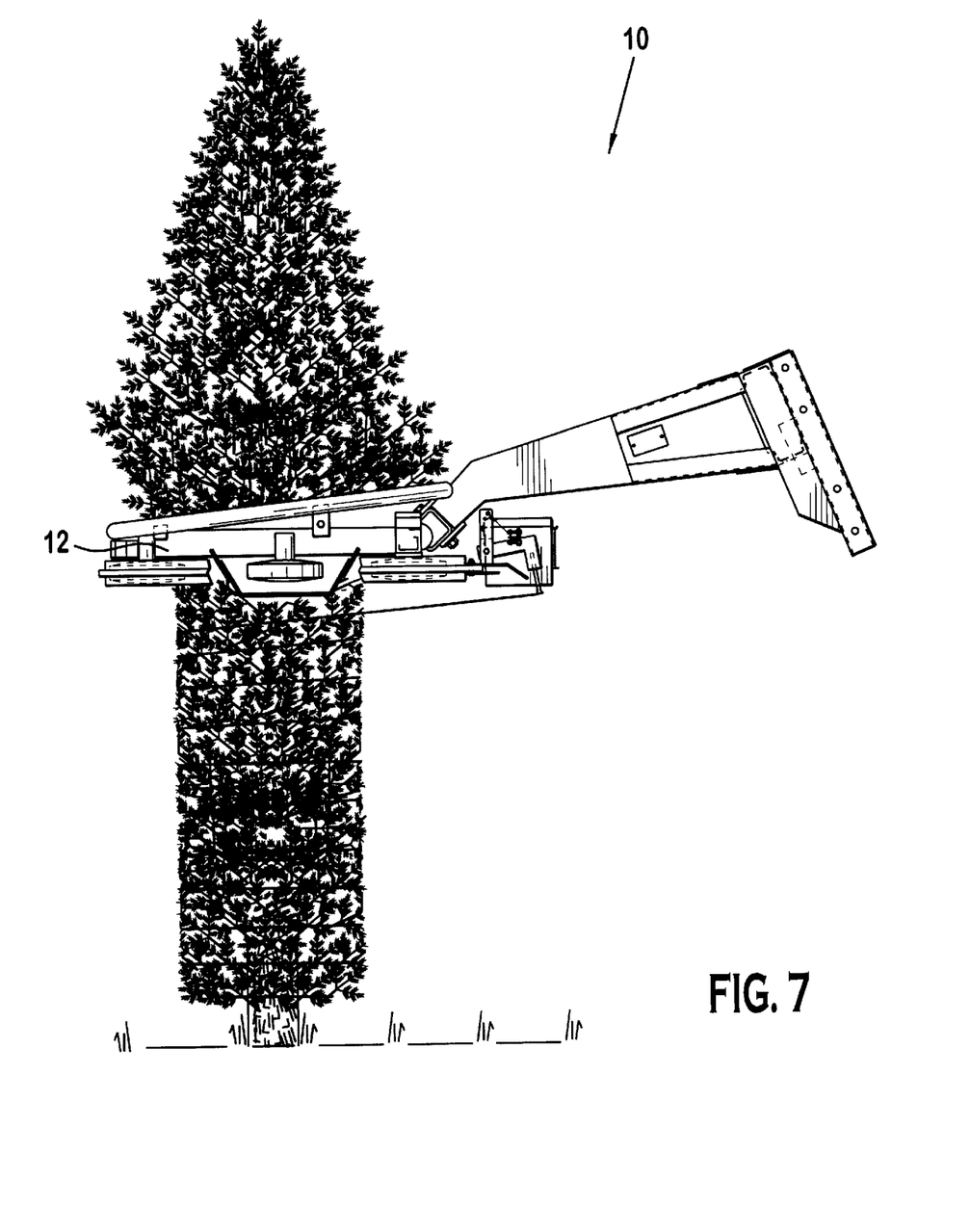
FIG. 7 is an elevational view of a tree being baled with the apparatus in accordance with the present invention.

In operation, the first frame 12 is attached to an elevateable support, such as a fork lift or other type of lift truck. As one skilled in the art will recognize, the rotary actuator 68 allows for orientation of the first, second and third frames to the tree trunk. As shown in FIG. 3, the first frame 12 is placed around the tree trunk by contact of the deflector plates 33 against the tree trunk while moving the apparatus 10 forward such that the tree trunk is received in the central area 13. Alternatively, actuators 72 may be utilized to open the front sections 30 if they are provided. The string from the dispenser 36 may be connected to the trunk of the tree and the motors 26 are actuated. Preferably, the motors 26 are hydraulic motors and are actuated by an auxiliary power take-off on the lift truck to a connected hydraulic line. The motors 26 drive the drive wheels 25 to rotate the second frame 20 about the central area as the apparatus 10, including the first frame 12 and second frame 20, is raised, as shown in detail in FIG. 7. String is dispensed from the canister 36 and wound around the tree to hold the branches in a constricted position as they are forced inwardly by the third frame 34 and the inwardly biased pivotable segments 22 to press the tree branches inwardly toward the trunk. Once the apparatus 10 has been lifted above the height of the tree, the string is cut and secured to the tree. Alternatively, if actuators 72 are provided, once baling has been completed to a desired height, the opening 21 in the second frame 20 is aligned with the opening in the first frame 12, and the actuators 72 are activated to open the front sections 30 so that the apparatus 10 can be removed. The baled tree can then be cut, such as in the case of Christmas trees or can be balled for transplanting for nursery operations.

The arrangement of the second rotatable frame 20 beneath the first frame 12 protects the second frame 20 as well as the idler wheels 24 and drive wheels 25 from interference of the tree branches as the tree is baled since the first frame and third frame force the tree branches upwardly and inwardly toward the tree trunk. This provides for safer operation and less jamming. Additionally, the pivotable segments 22 pivot downwardly a sufficient distance to protect the idler wheels 24 and drive wheels 25 from contact as the tree passes beneath the apparatus 10.

While the preferred embodiment of the invention has been described in detail, the invention is not limited to the specific embodiment described above, which would be considered as merely exemplary. Further modifications and extensions of the present invention may be developed based upon the foregoing, and also its modifications are deemed to be within the scope of the present invention.

What is claimed is:

1. An apparatus for baling a standing tree comprising:
a first frame defining a central area therewithin which is adapted to receive a lower trunk portion of a tree;
a front portion of the first frame having an open position to permit entry of a tree trunk through the front portion and into the central area;
a plurality of pivotable segments connected to the first frame that define an adjustable cone shaped structure around the central area which automatically adjusts to a size of the tree as the tree is baled when coming in contact with the tree;
a second frame, having a front portion with an opening, is mounted for rotational movement around the central area below the first frame;
at least one string dispenser;
a first motor drivingly connected to the second frame that rotates the second frame around the central area such that string from the dispenser is wound around the tree; and
the first frame is adapted for attachment to an elevateable support capable of placing the first frame around the tree trunk and raising both the first and second frames up to the top of the tree trunk such that as the first and second frames are raised string is dispensed from the dispenser and wound around the tree.

2. An apparatus of claim 1, further comprising a second motor drivingly connected to the second frame to rotate the second frame around the central area, the second motor spaced apart a distance from the first motor greater than an opening distance in the second frame such that at least one motor is drivingly connected to the second frame at all times.

3. An apparatus of claim 2, further comprising a plurality of support wheels, the plurality of support wheels supported from the first frame, the support wheels contacting a circular track located in the second frame, the support wheels keeping the second frame in alignment during rotation.

4. The apparatus of claim 1, wherein a third frame is connected to the first frame around the central area, and includes an opening at a front portion thereof, the third frame is located above the first frame and has a diameter greater than a diameter of the adjustable cone shaped structure and is adapted to press the branches inwardly toward the tree trunk.

5. The apparatus of claim 4, further comprising:
an attachment arm connected to the first frame, the attachment arm adapted to be connected to a lifting apparatus.

6. The apparatus of claim 5, further comprising an actuator connected between the attachment arm and the first frame to allow pivoting of the first frame.

7. The apparatus of claim 1, further comprising a plurality of support wheels connected to the first frame, the second frame including a channel section in which the support wheels are received.

8. The apparatus of claim 1, wherein the two sections of the first frame are spring loaded to move to the first position upon entry of the tree trunk into the central area.

9. The apparatus of claim 1, further comprising section actuators connected to the two sections of the first frame, the section actuators adapted to move the two sections of the first frame between the first and second positions.

10. The apparatus of claim 1, further comprising at least one drive wheel connected to the motor and in contact with the second frame so that when the drive wheel turns, the second frame rotates around the central area.

11. The apparatus of claim 10, wherein the at least one drive wheel is biased outwardly against the second frame.

12. The apparatus of claim 1, wherein the pivotable segments are spring biased inwardly.

13. A method of baling a tree comprising:
   placing a tree trunk into a central area of first and second frames of a baling apparatus by moving two pivotable front sections located in a front portion of the first frame, which move from a closed position to an open position to allow entry of the trunk through the front portion as the baling apparatus is moved laterally toward the trunk, prior to returning to the closed position, the second frame being rotatable around the first frame and a string dispenser being mounted thereon;
   securing a first end of a string to the tree to be baled;
   elevating the first and second frames toward a top of the tree;
   rotating the second frame with the string dispenser around the tree during elevation;
   dispensing string from the string dispenser during elevation, the dispensed string holding uplifted branches of the tree;
   removing the first and second frames from the top of the tree once the tree top elevation is reached; and
   cutting the string at the frame end dispenser.

14. The apparatus of claim 1, wherein the front portion of the first frame includes at least one section which is mounted for movement from a closed position to the open position to permit entry of a tree trunk through the front portion and into the central area, and then return back the closed position to form a circular enclosure around the lower trunk portion.

15. The apparatus of claim 14, wherein the at least one section is pivotally mounted to the front portion of the first frame.

16. The apparatus of claim 15, wherein the at least one section comprises first and second sections.

17. The apparatus of claim 16, wherein the front portion of the first frame includes first and second springs that bias the first and second sections, respectively, toward the closed position.

18. The apparatus of claim 17, wherein the front portion of the first frame further comprises first and second deflectors that cover the first and second springs, respectively, to permit smooth entry of the tree trunk into the central area.

19. The apparatus of claim 16, wherein the front portion of the first frame includes first and second actuators that move the first and second sections, respectively, between the open and closed positions.

20. An apparatus for baling a standing tree comprising:
   a first frame defining a central area therewithin which is adapted to receive a lower trunk portion of a tree;
   a front portion of the first frame includes two sections, which are mounted for movement from a first, closed position to a second open position to permit entry of a tree trunk into the central area, and then return back the first position to form a circular enclosure around the lower trunk portion;
   a plurality of pivotable segments connected to the first frame to define an adjustable cone shaped structure around the central area which automatically adjusts to a size of the tree as the tree is baled when coming in contact with the tree;
   a second frame, having a front portion with an opening, is mounted for rotational movement around the central area below the first frame;
   at least one string dispensing canister attached to the second frame;
   a first motor connected to the first frame and drivingly connected to the second frame to rotate the second frame around the central area such that string from the canister is wound around the tree;
   a third frame connected to the first frame around the central area, and includes an opening at a front portion thereof, the third frame is located above the first frame and has a diameter greater than a diameter of the adjustable cone shaped structure and is adapted to press the branches inwardly toward the tree trunk; and
   the first frame is adapted for attachment to an elevateable support capable of placing the first frame around the tree trunk and raising both the first and second frames up to the top of the tree trunk such that as the first and second frames are raised string is dispensed from the canister and wound around the tree.

21. The apparatus of claim 20, further comprising:
   an attachment arm connected to the first frame, the attachment arm adapted to be connected to a lifting apparatus.

22. The apparatus of claim 21, further comprising an actuator connected between the attachment arm and the first frame to allow pivoting of the first frame.

23. An apparatus for baling a standing tree comprising:
   a first frame defining a central area therewithin which is adapted to receive a lower trunk portion of a tree;
   a front portion of the first frame having at least one section that moves from a closed position to an open position to permit entry of a tree trunk through the front portion and into the central area, and then return back the closed position to form an enclosure around the lower trunk portion;
   a second frame, having a front portion with an opening, is mounted for rotational movement around the central area below the first frame;
   at least one string dispenser;
   a first motor connected to the first frame and drivingly connected to the second frame to rotate the second frame around the central area such that string from the dispenser is wound around the tree;
   a third frame including an opening at a front portion thereof, the third frame being located above and connected to the first frame around the central area and having a diameter greater than a diameter of the central area and is adapted to press the branches inwardly toward the tree trunk; and the first frame is adapted for attachment to an elevateable support capable of placing the first frame around the tree trunk and raising both the first and second frames up to the top of the tree trunk such that as the first and second frames are raised string is dispensed from the canister and wound around the tree.

* * * * *

UNITED STATES PATENT AND TRADEMARK OFFICE
CERTIFICATE OF CORRECTION

PATENT NO. : 6,666,133 B2
DATED : December 23, 2003
INVENTOR(S) : Lee W. Squyres It is certified that error appears in the above-identified patent and that said Letters Patent is hereby corrected as shown below:

<u>Column 3,</u>
Line 27, after the word "sections", delete "30" and insert therefor -- 30, 31 --.

Signed and Sealed this

Eighteenth Day of May, 2004

JON W. DUDAS
*Acting Director of the United States Patent and Trademark Office*